United States Patent [19]

Lazecki

[11] 3,917,935

[45] Nov. 4, 1975

[54] REDUCTION OF LOOK-UP TABLE CAPACITY

[75] Inventor: Stanislaw V. Lazecki, Norwalk, Conn.

[73] Assignee: United Technologies Corporation, Hartford, Conn.

[22] Filed: Dec. 23, 1974

[21] Appl. No.: 536,051

[52] U.S. Cl. .............. 235/156; 235/186; 340/172.5

[51] Int. Cl.[2] ....................... G06F 7/39; G06F 15/34

[58] Field of Search ........... 235/186, 152, 156, 160, 235/164; 340/347 DD, 172.5

[56] References Cited

UNITED STATES PATENTS

| | | | |
|---|---|---|---|
| 3,328,767 | 6/1967 | Ottaway | 340/172.5 |
| 3,610,905 | 10/1971 | Herron et al. | 235/156 X |
| 3,648,038 | 3/1972 | Sierra | 235/156 X |
| 3,735,110 | 5/1973 | Lecomte | 235/186 X |

*Primary Examiner*—Joseph F. Ruggiero

*Attorney, Agent, or Firm*—M. P. Williams

[57] ABSTRACT

A memory look up table, such as a read only memory (ROM) used in a system calculating the arithmetic ratio of two numbers, has its required memory storage reduced by first shifting the input data bits, representative of the magnitude of the numbers, to their more significant values whenever the magnitude of the largest of the two input numbers is less than that permitted by the maximum capacity of a system word, and using only some number of the shifted higher order data bits as the input address to the look up table. A method of controlling the shifting process by monitoring the most significant bits of input data, prevents the destruction of these more significant data bits when they are present.

2 Claims, 1 Drawing Figure

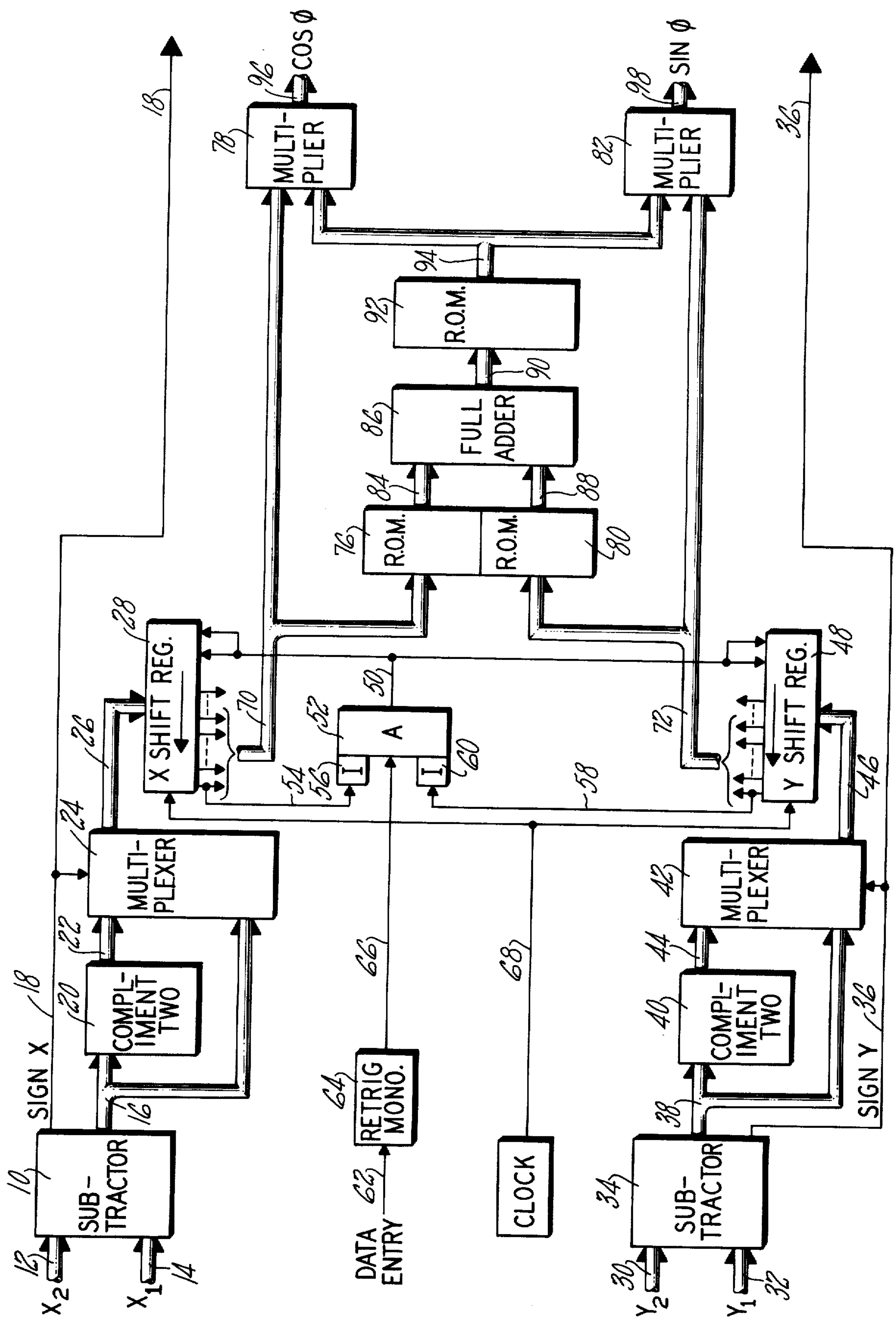
COS ϕ
SIN ϕ
MULTI-PLIER
MULTI-PLIER
R.O.M.
FULL ADDER
R.O.M.
R.O.M.
X SHIFT REG.
Y SHIFT REG.
A
I
I
MULTI-PLEXER
MULTI-PLEXER
COMPL-IMENT TWO
COMPL-IMENT TWO
SIGN X
SIGN Y
SUB-TRACTOR
SUB-TRACTOR
RETRIG MONO.
DATA ENTRY
CLOCK
$X_2$
$X_1$
$Y_2$
$Y_1$

REDUCTION OF LOOK-UP TABLE CAPACITY

BACKGROUND OF THE INVENTION

1. Field of Invention

This invention relates to a method of reducing the number of required addressable memory locations of a look up table used for storing information in a system performing ratio arithmetic operations, and more particularly to a method for reducing the required addressable memory locations without a commensurate loss of accuracy.

2. Description of the Prior Art

The use of memory look up tables, such as ROM's, for storing information in systems performing arithmetic operations is well known to the state of the art; however, any system incorporating such memory look up tables must give practical consideration to the required storage capacity if the size and subsequent cost of such devices is to be reduced.

The number of addressable memory locations within a look up table is defined by the total number of input address lines by the expression $2^n$, where $n$ represents the total number of input address lines. A reduction in the number of address lines by a quantity b results in a reduced number of storage locations defined by the expression $2^{n-b}$, which may be simplified to the form $2^n/2^b$. To illustrate, a system word with a capacity of twelve bits which is used as the input address to a ROM, requires a total of 4,096 memory locations within the ROM. A reduction of the input address by two lines results in the original number being divided by a factor of four, thereby, reducing the number of required memory locations to 1,024. This method of reducing ROM capacity by the simple elimination of the least significant bits is known to the present state of the art; however, it is undesirable since it results in a permanent loss of accuracy which greatly manifests itself for small magnitudes of input data and, therefore, cannot be used in systems requiring high resolution of input data which may vary over a range of values, from its most significant, to its least significant magnitudes. To again illustrate, referring to the example described hereinbefore, the elimination of 2 bits from a system word with a total capacity of 12 bits results in a minimum resolution of 4 out of the total number of 4,096, or approximately 0.1 percent of the full scale value, however, for an input data word containing only 6 bits of information a minimum resolution of 4 out of a possible number of 64 results in an error of 6.25 percent, the error increasing by a factor of 2 for each successive lower value of input data, such that an input data word containing only 4 bits of information will be accurate only to within a minimum of 25 percent.

Various methods of reducing ROM capacity in fixed applications may be found in the prior art. One such method is shown in a patent of C. LeConte, U.S. PAT. No. 3,735,110, describing a sine/cosine generator in which a ROM is used to store the sine values of angles. In the method described therein, the two most significant bits of input data containing information describing the quadrant in which the sine of cosine values of the angle is to be determined, are stripped away and processed, and only the remaining bits defining the angular value are used as the input address to the ROM. The reduction in memory storage locations is accomplished by using the trigonometric identity, cosine $x$ = sine $(90°-x)$, which requires the read only memory to store only sine values of angles between 0° and 90°. The disadvantage of this method is that the total number of system word bits describing the angular value are received as the input address to the ROM to provide system accuracy for small angular values.

SUMMARY OF INVENTION

The object of the present invention is to reduce the required memory storage capacity of a ROM used in an arithmetic unit for storing information required in the calculation of the ratio of two numbers, without a commensurate loss of accuracy in the resolution of small magnitude values.

According to the invention, the required capacity of a table look-up ROM is reduced by shifting the least significant bits of a pair of input data words to their more significant values whenever the magnitude of both input data words is less than that permitted by the maximum capacity of a system word, and presenting as the input addresses of the ROM only a selected number of the shifted higher order bits, less than the total number of bits comprising a system word, thereby providing a reduction in the number of required storage locations and consequently a reduction in the overall memory storage capacity.

According to one aspect of the invention, the shifting process is controlled to take into consideration both the polarity and magnitude of each of the input data words, and to limit the number of data bit shifts to that number permitted by the magnitude of the largest input word to prevent destruction of higher order data which may appear in either word. The invention is well suited to ratio arithmetic because shifting both input data word to more significant values, which is the mathematical equivalent of multiplying the input data by the factor $2^m$ (where $m$ represents the number of bit shifts performed) does not affect the accuracy of the final ratio calculation since the multiplying factor is common to both numerator and denominator, and therefore cancels. The shifting process of the invention has the advantage of reducing required ROM capacity while maintaining accurate resolution of the information present in the least significant bits of smaller magnitude data words.

Other objects, features and advantages of the present invention will become more apparent in the light of the following detailed description of a preferred embodiment thereof, as illustrated in the accompanying drawing.

BRIEF DESCRIPTION OF THE DRAWING

The sole FIGURE herein is a schematic diagram of an exemplary embodiment of the invention incorporated in a sine/cosine computer for calculating the sine and cosine of an angle of a two dimensional vector.

DESCRIPTION OF THE PREFERRED EMBODIMENT

An illustrative embodiment of the invention, shown in the drawing, is a sine/cosine computer for calculating the sine and cosine of a vector angle. The computer receives data describing the magnitude of the rectangular components (in $x$ and $y$) of the vector, and performs the necessary arithmetic operations to calculate the magnitude of the vector through the use of the Pythagorean theorem. The necessary ratio arithmetic is then performed to determine the ratio of the $x$ component divided by the magnitude of the vector to determine the cosine of the angle, and the magnitude of the $y$ component divided by the magnitude of the vector to determine the sine of the angle.

Since a two-dimensional vector is fully described in the X, Y plane its end point coordinates X1, Y1, X2, and Y2, the magnitude of the component vectors, $x$ and $y$, may be determined by subtraction, where $x = X2 - X1$ and $y = Y2 - Y1$. In the illustrative embodiment of the invention described hereinafter, the coordinate values consist of only positive numbers, this is accomplished by dividing the positive X, Y quadrant, whose boundaries are defined by the coordinates O, O and $X_{max}$, $Y_{max}$, into four smaller quadrants having a new origin at the coordinates $\frac{1}{2}X_{max}$, $\frac{1}{2}Y_{max}$.

Referring now to the drawing, the end point coordinates X2, X1 are received on the lines 12 and 14 respectively, which are connected to a subtractor circuit 10 comprised of arithmetic logic units well known to the state of the art such as the Texas Instruments SN74181. These arithmetic units perform the subtraction function by taking the two's complement of the subtrahend X1 and adding this to the minuend X2, with the magnitude of the sum appearing on output lines 16, and the sign bit appearing on the carry out line 18. The data appearing on the lines 16 represents the magnitude of the $x$ component, which for negative values (when X1 is larger than X2) will appear in a two's complement form, and for positive values will appear in a true binary form. The data on the lines 16 is presented to a complement two circuit 20, comprised of arithmetic logic units of the type described hereinbefore, which converts all data appearing on the lines 16 into a complement two format on the lines 22. The lines 16 and 22 are presented to a multiplexer 24 which selects the data on the lines 16 when a positive polarity bit appears on the line 18 indicating that the data on the lines 16 is in true binary form, and conversely selects the data on the lines 22 for a negative polarity bit indicating that the data on the lines 16 is in complement two format, and that the output of the complement two circuit 20 (which re-converts the signals on the lines 16 to true binary form) is correct. The multiplexer 24 switches the selected data to its output lines 26 which are connected to the $x$ shift register 28. The calculation of the $y$ component is performed in an identical manner. The coordinates Y2, Y1, on lines 30, 32 are received by the subtractor 34 whose output consists of the sign bit on the line 36, and the magnitude of the sum on the lines 38 which are connected to a complement two circuit 40, and a multiplexer 42. The multiplexer 42 also receives the output of the complement two circuit on the lines 44 and switches the data on one of these sets of lines, as determined by the appropriate polarity bit on the line 36, to the data lines 46 which are connected to the $y$ shift register 48. The data loaded into shift registers 28, 48 represents the magnitude of the $x$ and $y$ components respectively in true binary format.

The data on the lines 26, 46 are loaded into the shift registers 28, 48 respectively, during the period in which a load enable signal on a line 50 is low, indicating the initial transmission of new input data. The load enable signal on the line 50 is generated by an AND gate 52 which receives as its inputs; the most significant bit of the $x$ component data appearing on a line 54 which first passes through an inverter gate 56; the most significant bit of the $y$ component data appearing on a line 58 which is first inverted in the inverter gate 60; and a discrete data entry signal, generated in any suitable way, such as by system software, which appears as a logic high on a line 62 during the data entry period and is first received by a retriggerable monostable multivibrator 64 which generates a high signal on a line 66 whose leading edge is delayed by a predetermined delay period from that of the signal on the line 62. The signal on the line 66, which is at a logic low immediately after the receipt of new coordinate data, causes the AND gate 52 to maintain a low signal on the line 50 for a minimum delay period equivalent to that of the multivibrator 64, thus allowing the new data on the lines 26,46 to be entered into the shift registers 28 and 48 respectively. At the end of this delay period, the signal on the line 66 transitions to a high, and if the most significant bits of both the $x$ and $y$ component data are at low levels, the signal on the line 50 will transition to a high prohibiting further data entry into the shift registers and causing a serial shift of the data within these registers toward their more significant values, in one bit increments, which are synchronous with a clock signal on a line 68 which is connected to both registers. The serial shift continues for successive clock pulses until the most significant bit of either the $x$ or $y$ component on the lines 54, 58 transitions to a logic one level, thereby causing the signal on the line 50 to transition to a low level prohibiting further shifting.

A pair of lines 70 and 72 are connected to the more significant value outputs of shift registers 28, 48, such that the least significant bits of the data present within these registers is not received. The data appearing on the lines 70, 72 will be equal to the data appearing on the lines 26, 46, less their least significant bits if no shifting has been permitted (the most significant bits of the data on either of the lines 26 or 46 appeared at logic high levels); or, if a shift has occurred, the data will be equal to the original data received by the shift registers, multiplied by the factor $2^m$, where $m$ equals the number of bit shifts. The signal on the lines 70 is presented to a ROM 76 and a multiplier 78, similarly the signal on the lines 72 is presented a ROM 80 and a multiplier 82.

The ROM 76 receives the signal on the lines 70 which are of the form $2^m x$, squares this signal, and presents on its output data lines 84 the quantity $(2^m x)^2$, which is presented as one input to the full adder 86. The ROM 80 performs the identical function as the ROM 76, receiving the signal on the lines 72 which are of the form $2^m y$, and generating on its output lines 88 the quantity $(2^m y)^2$, which is received as the second input to the full adder 86. The output of the full adder 86 appears on the lines 90 as the quantity $(2^m x)^2 + (2^m y)^2$, and is presented to a third ROM 92 which generates on its output lines 94 the reciprocal of the square root of the signals appearing on the lines 90, which appears as the quantity $$\frac{1}{2^m(x^2 + y^2)^{1/2}}$$

The multiplier 78 multiplies the signal on the lines 70 and the signal on the lines 94 to produce the product $$\frac{x}{(x^2 + y^2)^{1/2}}$$

on the lines 96, while the multiplier 82 multiplies the signal on the lines 72 and the signal on the lines 94 to produce the product $$\frac{y}{(x^2 + y^2)^{1/2}}$$

on the lines 98. The signal on the lines 96 read in conjunction with the sign bit of $x$ on the line 18, defines the cosine value of the vector angle, similarly the signal on the lines 98 read in conjunction with the sine bit of $y$ on the line 36 defines the sine value. It should be noted that the value of the signals appearing on the lines 96, 98 are the result of a ratio calculation wherein both numerator and denominator contain the factor $2^m$. This factor cancels in this final calculation and therefore, the shifting process which introduced this term has no effect upon the accuracy of the final ratio calculation.

The method of shifting the input data permits the reduction of the memory storage capacity of ROMs 76 and 80 below that which would be required of a ROM receiving the total number of system word bits, while still preserving the processing accuracy of smaller magnitude data words. Although the implementation of the data shifting process is greatly simplified when used in a ratio arithmetic system which permits cancellation of the shift factor $2^m$, it may be used in any system in which the reduction in ROM capacity is desirable, by counting the number of shifts performed and using this information to provide later reconversion if necessary. Similarly, the shift process may be modified or expanded beyond that described hereinabove to accomodate shifting of data received in any digital format as may be dictated by system requirements, such as the direct receipt of data in the two's complement form.

Although the invention has been shown and described with respect to preferred embodiments thereof, it should be understood by those skilled in the art that the foregoing and various other changes and omissions in the form and detail thereof may be made therein without departing from the spirit and the scope of the invention.

Having thus described a typical embodiment of my invention, that which I claim as new and desire to secure by Letters Patent of the United States is:

1. A circuit for reducing the storage capacity of a memory look-up table which, in response to its input address consisting of a plurality of data bits representative of the numerical values of numbers on which an arithmetic function is to be performed, provides information to a system calculating the arithmetic ratio of two numbers, comprising:

a pair of shift registers each, for receiving the plurality of data bits representing a related number;

means presenting a clock signal for providing synchronous operation of said shift registers;

gate means for selectively applying said clock signal to said shift registers for shifting the data bits in said registers toward their more significant values whenever the magnitude of the largest of the two input numbers contains a quantity of data bits less than the maximum number permitted by the capacity of the system word; and means for providing the outputs of said shift registers comprising the more significant values of the shifted data bits to the input address lines of the memory look-up table.

2. A circuit according to claim 1 wherein said gate means is operable in response to a zero in the highest-ordered stage of both of said shift registers concurrently.

* * * * *

UNITED STATES PATENT OFFICE

CERTIFICATE OF CORRECTION

PATENT NO. : 3,917,935

DATED : November 4, 1975

INVENTOR(S) : Stanislaw V. Lazecki

It is certified that error appears in the above-identified patent and that said Letters Patent are hereby corrected as shown below:

Column 1, line 12, after "accuracy." insert --The invention described herein was made in the performance of work under a NASA contract and is subject to the provisions of Section 305 of the National Aeronautics and Space Act of 1958, Public Law 85-568 (72 Stat. 435; 42 U.S.C. 2457).--

Signed and Sealed this

*seventeenth* Day of *February 1976*

[SEAL]

*Attest:*

RUTH C. MASON
*Attesting Officer*

C. MARSHALL DANN
*Commissioner of Patents and Trademarks*